(12) United States Patent
Chessman et al.

(10) Patent No.: US 6,498,704 B1
(45) Date of Patent: Dec. 24, 2002

(54) DISK DRIVE WITH VISCOELASTIC DAMPER DISPOSED BETWEEN ADJACENT LOAD BEAMS

(75) Inventors: H. Ross Chessman, Erie, CO (US); Andrew A. Lucas, Lyons, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/511,336

(22) Filed: Feb. 23, 2000

(51) Int. Cl.$^7$ .......................... G11B 21/16; G11B 33/08
(52) U.S. Cl. .................. 360/265.9; 360/97.03; 360/244.5
(58) Field of Search .................. 360/265.9, 244.5, 360/244.6, 244.7, 245.2, 97.02, 97.03, 97.04

(56) References Cited

U.S. PATENT DOCUMENTS

| | | | |
|---|---|---|---|
| 4,605,979 A | * | 8/1986 | Inoue et al. |
| 4,891,724 A | | 1/1990 | Yeakley et al. |
| 5,363,262 A | | 11/1994 | Drennan |
| 5,508,864 A | | 4/1996 | Briggs et al. |
| 5,621,590 A | | 4/1997 | Pace et al. |
| 5,734,524 A | | 3/1998 | Ruiz |
| 5,734,525 A | | 3/1998 | Girard |
| 5,745,319 A | | 4/1998 | Takekado et al. |
| 5,771,135 A | * | 6/1998 | Ruiz et al. |
| 5,796,554 A | | 8/1998 | Berding et al. |
| 5,841,609 A | * | 11/1998 | Tochiyama |
| 5,877,919 A | * | 3/1999 | Foisy et al. |
| 5,956,210 A | * | 9/1999 | Kaneko |
| 6,091,578 A | * | 7/2000 | Stole et al. |
| 6,215,625 B1 | * | 4/2001 | Carlson .................... 360/244.7 |

FOREIGN PATENT DOCUMENTS

| | | | |
|---|---|---|---|
| JP | 01-092977 | * | 4/1989 |
| JP | 02-216682 | * | 8/1990 |
| JP | 04-049583 | * | 2/1992 |
| JP | 05-325459 | * | 12/1993 |

* cited by examiner

*Primary Examiner*—Craig A. Renner
(74) *Attorney, Agent, or Firm*—Marsh Fischmann & Breyfogle LLP

(57) ABSTRACT

A disk drive with load beam damping is disclosed. Multiple disks are provided on a spindle for storage of information thereon. A rigid actuator arm block is disposed radially beyond a perimeter of these disks. Flexible load beams with read/write heads thereon extend from the actuator arm block into the space between adjacently disposed disks to read/write information from/to these disks. At least one damper is disposed between each of the load beam pairs to reduce load beam vibrations for the disk drive. Preferably these dampers also serve to further structurally interconnect the noted load beam pairs. Load beam damping may also be provided for those load beams which provide access to the extreme read/write surfaces of the disk stack, as well as for disk drives which utilize a single disk.

18 Claims, 2 Drawing Sheets

DISK DRIVE WITH VISCOELASTIC DAMPER DISPOSED BETWEEN ADJACENT LOAD BEAMS

CROSS-REFERENCE TO RELATED APPLICATIONS

Not applicable.

STATEMENTS REGARDING FEDERALLY SPONSORED RESEARCH OR DEVELOPMENT

Not applicable.

FIELD OF THE INVENTION

The present invention generally relates to the field of disk drives and, more particularly, to damping vibrations in a at least one load beam or suspension which extends toward a computer-readable storage medium disk and which carries a transducer or head to read and/or write information from/to such disk.

BACKGROUND OF THE INVENTION

Vibrations are an area of concern in disk drive designs, particularly in relation to portable computers. One type of damping system which has been employed in previous disk drive designs is illustrated in FIG. 1 which, as noted thereon, is admitted to be prior art. The disk drive 2 of FIG. 1 includes a disk 6 which has a plurality of concentric tracks (not shown) for storing information thereon and which rotates about an axis 8 at typically high speeds. Information is stored onto and read from the disk 6 by a read/write assembly 12. Components of the read/write assembly 12 include a rigid actuator arm 14 which extends from a location beyond a perimeter 10 of the disk 6 to a location "over" the disk or toward but not typically to the rotational axis 8 of the disk 6 (i.e., a reference ray extend perpendicularly from the disk 6 will intersect the actuator arm 14), a flexible suspension or load beam 18 which is fixedly attached to the actuator arm 14 in cantilevered fashion and disposed in opposing relation to one of the two primary data storage surfaces of the disk 6, and a transducer or head 22 which is attached to the load beam 18 and which interfaces with the disk 6 to read and/or write information from/to the disk 6 in a manner known in the art (e.g., by rotational motion of the actuator arm 14 by a voice coil motor to vary the position of the head 22 relative to the disk 6 during rotation of the disk 6). Common practice is for the head 22 to be mounted on the load beam 18 via a slider, gimbled connection, or the like (not shown).

Some disk drive designs which employ a gimbled connection of the head 22 to the load beam 18 have experienced problems with vibrations in this region. The disk drive 2 includes what is commonly referred to as a constrained layer damper 26 to provide sheer damping capabilities or damping of vibrations which are directed generally parallel with the surface of the disk 6 in relation to such a gimbled interconnection. Components of the constrained layered damper 26 include a metal layer 34 which is interconnected with the load beam 18 by an adhesive layer 30. One shortcoming associated with damping mechanisms of this type is that it increases the manufacturing costs of the disk drive. For instance, it is common to remove the load beam 18 from the clean room to install the constrained layer damper 18, such that the load beam 18 with the constrained layer damper 26 mounted thereon must be re-cleaned before reentering the clean room for continuation of the assembly of the disk drive 2. Labor-intensive operations are also involved with the actual installation of constrained layer dampers 26. One such constrained layer damper 26 is required for each load beam 18 of the disk drive 2 which may include a relatively large number of disks in a stack. All of these factors contribute to the overall cost of the disk drive 2. Another problem with these types of vibration damping systems is that constrained layer dampers 26 really only provide sheer damping capabilities. No significant damping is provided in relation to any motion of the head 22 toward the disk 6 by constrained layer dampers 26. Finally, the constrained layer damper 26 is mounted toward the end of the cantilevered connection of the load beam 18 to the actuator arm 14. This increases the gram-loading of the load beam 18 and thereby the control of the position of the head 22 relative to the disk 6.

BRIEF SUMMARY OF THE INVENTION

The present invention generally relates to damping vibrations in disk drives. A first aspect of the present invention relates to what is commonly referred to as a depopulated disk drive which includes at least two disks which define a computer-readable storage medium system of sorts. Each of the disks is a separate computer-readable storage medium (e.g., magnetic) for the storage of information thereon. These two disks are separated by a space and are typically mounted on a typically vertically disposed spindle for rotation within a typically horizontally disposed plane. Other spindle/disk orientations may be utilized. A pair of load beams or suspensions are disposed within the space between the two noted disks. Each of these load beams has a transducer or head mounted on typically an end portion thereof which projects toward one of the disks. These heads thereby project in at least generally opposite directions. Typical functions provided by the noted heads are to read and/or write information from/to their corresponding disk. Movement of the load beams relative to the disks is provided by a load beam drive assembly (e.g., actuator arm with voice coil) and is used to vary the radial position of the heads relative to their respective disk and access different storage regions of the disks. Linear actuators could also be employed. Notably, a damper is disposed between and more preferably couples the two noted load beams. Again, this first aspect of the present invention is applicable to depopulated drives having more than two disks. In such disk drives, preferably each pair of load beams which is disposed within a common space between two adjacently disposed disks includes a damper of the type presented by this first aspect. Moreover, the load beam associated with the end surface of each of the disks on opposite ends of the disk stack may also include such a load beam damper as well, such as in accordance with the third aspect of the present invention which is addressed below.

Various refinements exist of the features noted in relation to the first aspect of the present invention. Further features may also be incorporated in the subject first aspect as well. These refinements and additional features may exist individually or in any combination. Contact between the head and its corresponding disk usually exists when the disk drive is "off" (e.g., when the computer-readable storage medium disks are not spinning). Each of the noted load beams may include a hinge and a spring, or a hinge/spring assembly, which collectively allow their corresponding head to be biased toward their corresponding disk to maintain this type of contact. During rotation of the computer-readable storage medium disks (except possibly at the initial startup where a lift-off mechanism may be employed to displace the heads from their corresponding disk), however, the resulting air cushion of sorts above the rotating disks maintains their corresponding heads a predetermined distance thereabove ("fly height") by a controlled flexure of the load beam (e.g., about the hinge and based on the biasing forces generated by the spring). As such, the load beams are flexible and also commonly referred to as suspensions. The damper associated with a particular load beam may be a different structure from the load beam's hinge and spring flexure system of sorts. Moreover, preferably the damper is disposed at a location which is at least generally proximate where the noted load beams interconnect with the load beam drive assembly and which is typically a cantilevered interconnection. In the case where the load beam drive assembly includes a rigid actuator arm or actuator arm block which accommodates a plurality of load beams for simultaneous movement thereof, preferably the damper between the noted pair of load beams also interfaces with the actuator arm through an abutting engagement therewith.

At least a certain amount of bias may be provided by the damper, such as for maintaining the same in a certain positional relationship. This may be affected by having the damper be under compression when disposed between the noted pair of load beams. Biasing forces applied to each of the two load beams by a given damper would thereby be directed toward their corresponding disk. Various foams and the like may be put under compression and thereby are an appropriate structure for the damper of the subject first aspect. Retention of the damper between the noted pair of load beams may be enhanced/provided by compression of the damper between adjacent load beams (e.g., establishing a sufficient frictional interface between the damper and each of the load beams of the noted load beam pair). Other ways of maintaining a fixed positional relationship between the damper and the two load beams of the noted load beam pair may be utilized as well, such as by applying appropriate adhesives and the like, in which case preloading of the damper would not be required. Chemical bonds may be employed between the damper and the load beam drive assembly (e.g., actuator arm or block), while limiting the "bond" between the damper and its associated load beams to a frictional interface (with or without preloading). In this case, the damper may be installed on the load beam drive assembly before the load beams are attached to the load beam drive assembly.

Appropriate materials for the damper include without limitation viscoelastic materials, elastomers, foams, springs, martensitic memory effect metal ("marmem"), and the like. There are ways of characterizing the damping function provided by the damper of the subject first aspect other than by material selection. For instance, the damper of the first aspect may be characterized as a structure which dampens even its own vibrations. Yet another way of characterizing the damper of the first aspect is that it may be a structure which converts vibrational energy into heat. Still another way of characterizing the damping capabilities of the damper is that it may have a transmissibility (i.e., a ratio of force transmitted by the damper to the force exerted on the damper) of no more than about 80%. The damper of the subject first aspect may also be characterized as a structure which dampens an amplitude of an oscillatory motion of any one or more of load beams (side to side or parallel to the disks, toward and away from the disks, or both) of the noted load beam pair by least about 20% in comparison to if the damper was removed, but with same oscillatory motion continuing. Finally, the damper may be characterized as one which is structured such that the gram-loading on any of its corresponding load beams is no more than about 0.5 gram force.

Further functionality may be provided by/realized through the noted damper of the subject first aspect. Selection of an appropriate material for the damper may also allow the same to provide a particulate filtering function together with the noted vibration damping function with the same "structure" (e.g., through using a low density foam for the damper which would provide both vibration damping and particulate filtering function because of its porous structure). Laminated structures could also be used by the damper to provide both a damping function and filtering function (e.g., separately attaching a filtering structure to an appropriate damping structure). Modification of the air flow within the disk drive may also be realized by the noted damper. Reductions of the air flow within the disk drive should be realized by the inclusion of the damper, which should further reduce load beam vibrations due to windage. It is possible that the damper could be contoured/shaped so as to direct the air flow within the disk drive, such as by directing an air flow to a separate filter structure within the disk drive as well.

A second aspect of the present invention relates to the assembly of a depopulated disk drive. A first head is attached to a first load beam and a second head is attached to a second load beam. Both of the first and second load beams are attached to an actuator arm or actuator arm block which in turn is mounted on a spindle or other appropriate pivot member. When fully assembled, the heads on the load beams are disposed in a space between a pair of adjacently disposed disks. Damping of load beam vibrations is provided by mounting a damper between the first and second load beams which also preferably couples these load beams. Although this damper may be disposed between the first and second load beams after being attached to the actuator arm, preferably the damper is mounted on the actuator arm prior to the attachment of the load beams to the actuator arm.

A third aspect of the present invention is embodied in a disk drive which includes at least one disk of a computer-readable storage medium, which will hereafter be referred to as a "first disk." There is also a first suspension or load beam with a first head secured thereto to provide read, write, or read and write functions in relation to the first disk. The first load beam also includes a first hinge/spring assembly principally to bias the first head toward the first disk in a predetermined manner. Movement of the first load beam relative to the first disk, and thereby the first head attached thereto, allows the first head to access different data storage regions of the first disk. A damper interfaces with both the first load beam and its drive mechanism to provide principally a vibrational damping function for the first load beam.

Various refinements exist of the features noted in relation to the third aspect of the present invention. Further features may also be incorporated in the subject third aspect as well. These refinements and additional features may exist individually or in any combination. For instance, the damper and the first hinge/spring assembly may be disposed at displaced locations which further emphasizes that such are in fact different/separate structures. The drive assembly for the first load beam may include an actuator arm having a first actuator arm tip which is defined by a notch. The first load beam may be attached to and/or interface with the actuator arm distally of this notch (i.e., in a direction which is at least generally away from the disk) and pass over the first actuator arm tip toward the first disk. The space between the overlying portions of the first actuator arm tip and the first load beam may be occupied by the damper. The characteristics of the damper presented in relation to the first aspect of the present invention may be utilized in this third aspect of the present invention as well.

DETAILED DESCRIPTION OF THE INVENTION

Figure 1:
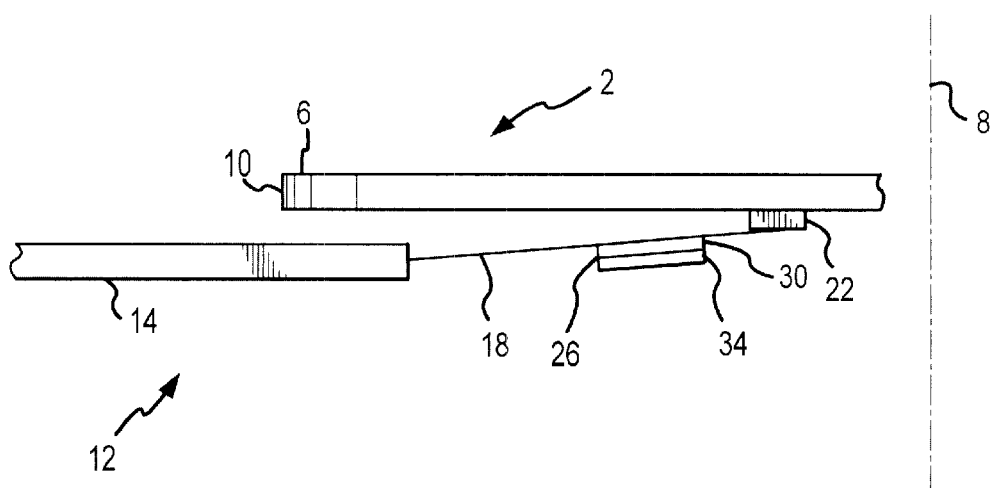
FIG. 1 is a cutaway side view of a prior art disk drive with a constrained layer damper for a load beam/suspension/flexure.
Figure 2:
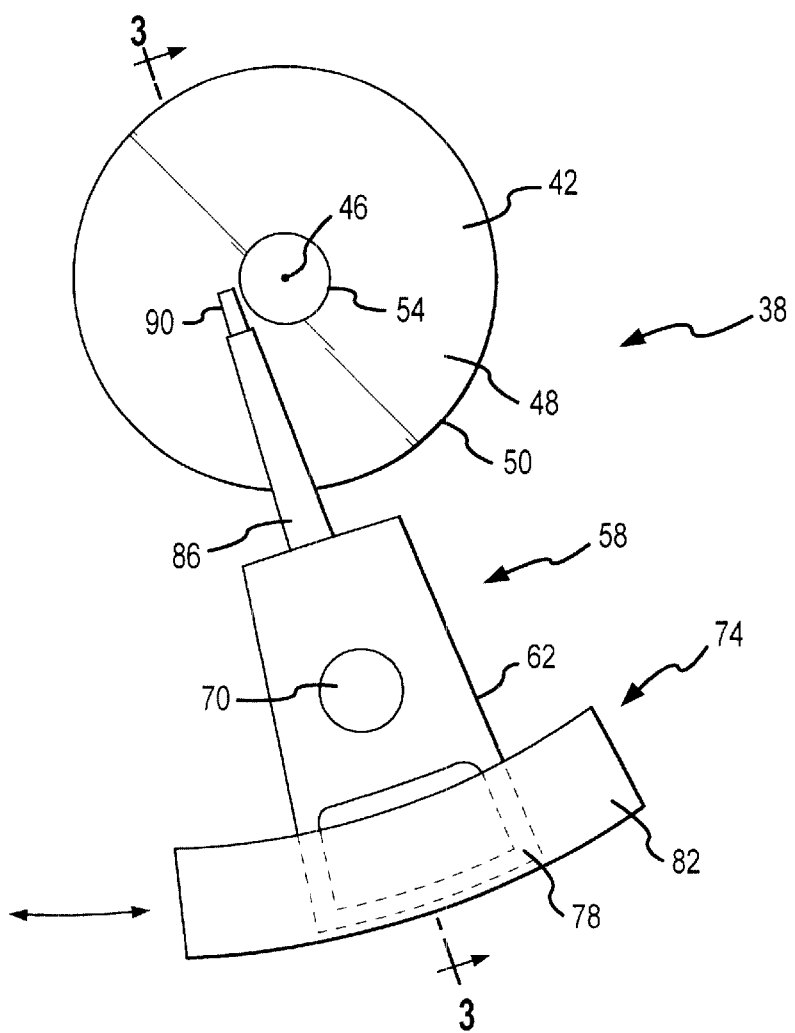
FIG. 2 is a top view of a disk drive in accordance with principles of the present invention.
Figure 3:
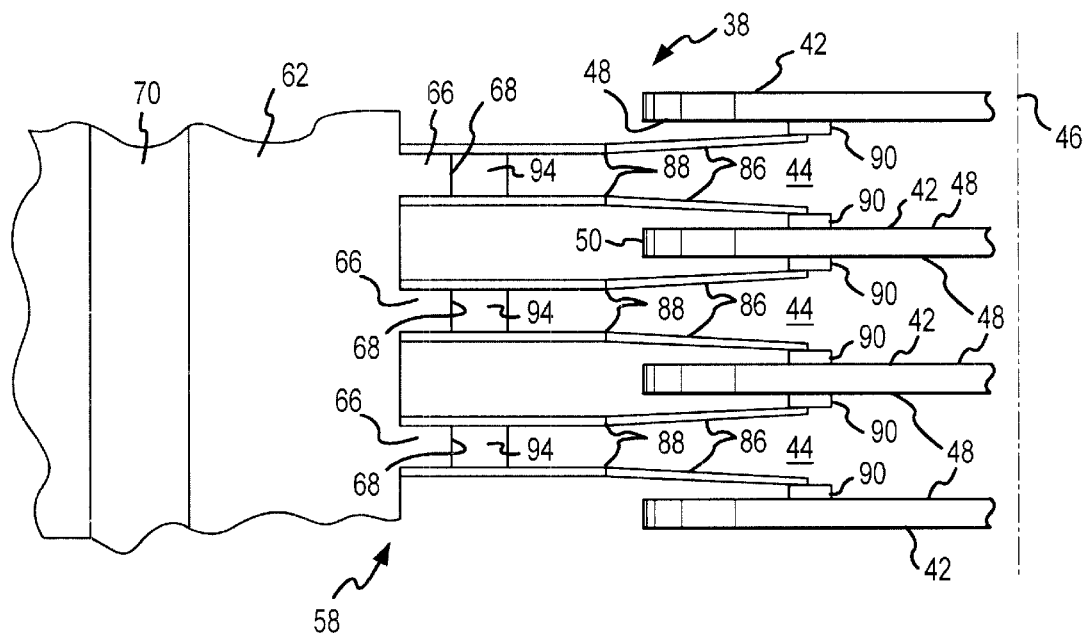
FIG. 3 is a cutaway side view of the disk drive of FIG. 2 taken along line 3—3.

The present invention will now be described in relation to the accompanying drawings which at least assist in illustrating its various pertinent features. FIGS. 2–3 illustrate a depopulated disk drive 38 which includes at least two at least generally horizontally disposed disks 42. Each disk 42 preferably includes a pair of opposing read/write surfaces 48 on which information may be stored and retrieved to maximize the data storage capabilities of the disk drive 38. Not all read/write surfaces 48 need be made available for data storage. One way to characterize these disks 42 is as a computer-readable storage medium (e.g., having a plurality of concentrically disposed tracks on each of the surfaces 48). These disks 42 are mounted on an at least generally vertically disposed spindle 54. Adjacent disks 42 are separated by a space 44. The plurality of at least generally horizontally disposed, at least generally vertically spaced disks 42 define a stack 40, which in turn may be characterized as a computer-readable storage medium system. Rotation of the stack 40 is thereby about a center axis 46 which is coincident with the spindle 54 and is provided by rotating the spindle 54 via an appropriate source (not shown).

Information may be read from one or more of the disks 42, and preferably written to these disks 42, by a read/write assembly 58. The read/write assembly 58 includes an actuator arm block or "E-block" 62 which is pivotally interconnected with the support structure of the disk drive 38 (e.g., its encasement) via a hub 70 and which includes a plurality of vertically spaced actuator arm tips or load beam mounts 66. Typically the actuator arm block 62 is designed as a rigid structure such that there is at least substantially no deflection of the load beam mounts 66 under normal operating conditions. Movement of the actuator arm block 62 is affected through a rotary actuator 74 which includes a coil 78 mounted on the actuator arm block 62 and a magnet 82 which is maintained in fixed relation relative to the actuator arm block 62. This arrangement is commonly referred to as a voice coil or a voice coil motor. How the actuator arm block 62 is moved relative to the disks 42 is not of particular importance in relation to the present invention. As such, a linear actuator could be used as well Appropriately secured to the load beam mounts 66 are a plurality of load beams 86 which extend from the actuator arm block 62 toward the disks 42 in cantilevered fashion (i.e., only one end of the load beams 66 is supported). All portions of the actuator arm block 62 are disposed beyond a perimeter 50 of the disks 42, such that the cantilevered interconnection between each of the load beams 86 and the actuator arm block 62 is also disposed radially beyond the perimeter 50 of each of the disks 42. Stated another way, the distance of the actuator arm block 62 from the center axis 46 associated with the stack 40 of disks 42 is greater than the distance between the perimeter 50 of the disks 42 and this same center axis 46. Stated yet another way, any reference ray extending perpendicularly from the read/write surface 48 of any disk 42 will not intersect with any portion of the again preferably rigid actuator arm block 62. Only the flexible load beams 86 extend within the spaces 44 between the disks 42. However, the load beam mounts 66 could be configured to extend within the space 44 (not shown).

Figure 5:
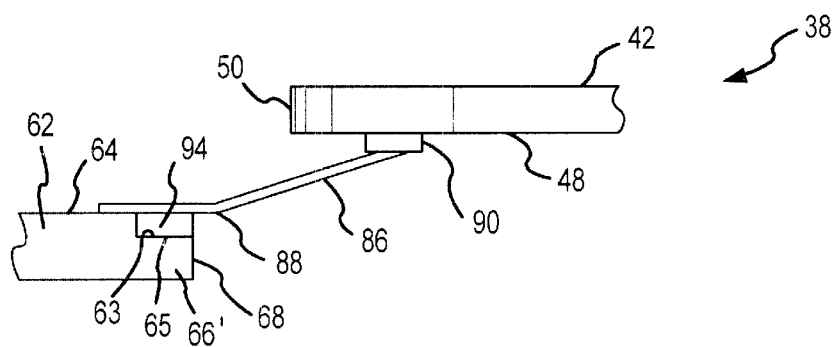
FIG. 5 is a cutaway side view of a portion of the disk drive of FIG. 2, namely of the bottom disk in the disk stack.

A pair of load beams 86 are attached to each load beam mount 66 which is again disposed radially outwardly from a space 44 defined between adjacent disks 42 in the illustrated embodiment. Only one load beam 86 will be attached to the uppermost and lowermost load beam mount 66 of the actuator arm block 62 to interface with the uppermost and lowermost read/write surfaces 48 of the stack 40 (i.e. the "outer" surfaces of the two disks 42 which define the two ends of the stack 40, or those surfaces which do not project toward another disk, and as illustrated in FIG. 5). Each load beam 86 includes a hinge/spring assembly 88 to bias the load beam 86 toward its corresponding disk 42 and for allowing controlled flexure of the load beam 86 during operation of the disk drive 38. Disposed on an end portion of each of the load beams 86 is a head or head gimble assembly 90 which is able to read information from the corresponding disk 42, and preferably which is further capable of writing information to this disk 42 as well. Flexure of the load beams 86 through the hinge/spring assembly 88 is utilized to allow the heads 90 to move away from their corresponding disk 42 to a predetermined position or to accurately maintain the fly height of the heads 90 (distance of the heads 90 from their corresponding disk 42) during operation. Both the rotational speed of the disks 42 (which directs the heads 90 away from the disks 42) and the flexure of the load beams 86 through the hinge/spring assembly 88 (which biases the heads 90 towards the disks 42) cooperate to determine the fly height of the heads 90.

Pairs of load beams 86 which extend into the same space 44 between adjacently disposed disks 42, and which are interconnected with a common load beam mount 66 of the actuator arm block 62, are further structurally coupled by a damper 94. Vibrations of the load beams 86 are damped by the dampers 94. One type of damping provided by the dampers 94 relates to vibrations or oscillatory motions of the load beams 86 which are at least generally parallel with the read/write surfaces 48 of the disks 42 (e.g., a "side-to-side" motion of the load beams 86). Motions of this type have a tendency to dispose the head 90 of a load beam 86 moving in this manner "off track" in relation to one of the tracks typically formed on the corresponding read/write surface 48 of the corresponding disk 42. Each disk 42 again typically includes a plurality of tracks which are concentrically disposed about the center axis 46 for the storage of information thereon. Motions of this "side to side" type obviously can adversely affect data retrieval capabilities. Another type of vibration which is damped by the dampers 94 is a motion of the load beams 86 which directs the heads 90 toward/away from the read/write surfaces 48 of the disks 42 (e.g., slap). Motions of this type have a tendency to damage one or more of the head 90 or corresponding disk 42. The types of damping provided by the dampers 94 as addressed herein are equally applicable to both of the above-noted types of vibrations.

One key positional characteristic of sorts relating to the dampers 94 is that they actually couple or tie a pair of load beams 86 together of the above-described type, and further that one damper 94 provides a damping function for two load beams 82 in contrast to systems which use constrained layer dampers where one-to-one correspondence exists between the constrained layer dampers and load beams (i.e., one contrained layer damper is provided for each load beam in these prior art systems). There are certain positional characteristics of the dampers 94 that should also be noted. FIG. 3 illustrates that the dampers 94 are disposed beyond the perimeter 50 of each of the disks 42 so that they may be disposed between and couple load beams 86 which extend into a common space 44 between a pair of adjacent disks 42. However, in cases where the load beam mounts 66 extend into their corresponding space 44, the dampers 94 would also be disposed in the corresponding space 44. Another positional characteristic of the dampers 94 may be made in relation to the actuator arm block 62. The dampers 94 are disposed at least generally proximate to, and more preferably in interfacing relation with (e.g., via an abutting engagement), the actuator arm block 62. More specifically and as shown in the illustrated embodiment of FIG. 3, the dampers 94 engage an end portion 68 of the load beam mounts 66 which projects at least generally toward the stack 40 of disks 42. This is desirable in at least a number of respects. It is common practice for the load beams 86 and heads 90 to be manufactured and assembled at one location (e.g., by one vendor), and for the actuator arm block 62 to be manufactured at a different location (e.g., by another vendor). Incorporation of the damper 94 into the disk drive 38 need not change this protocol, and need not raise additional clean room issues. For instance, the damper 94 may be attached to an end portion 68 of each of the load beam mounts 66 prior to the attachment of the load beams 86 to the load beam mounts 66 (e.g., via staking). Attachment of the dampers 94 to the load beam mounts 66 may be realized through appropriate adhesives, mechanically locking tabs or features, friction, and the like.

Another benefit to positioning the dampers 94 at the interconnection of the load beams 86 and the actuator arm block 62 is that the dampers 94 may be incorporated into the design of the disk drive without having a significant adverse effect on the gram-loading of the load beams 86. Disposing the dampers 94 further from the cantilevered connection of the load beams 86 to the actuator arm block 62 increases the gram-loading of the load beams 86. In one embodiment, the gram-loading of each load beam 86 is no more than about 3 grams even with the damper 94 being incorporated into the disk drive 38.

The noted positioning of the dampers 94 also allows the same to provide more of a damping function than a "stop" function. Disposing the dampers 94 closer to the head 90 would cause the damper 94 to function more as a stop than as a vibration damper. Finally, the noted positioning of the dampers 94 has a reduced effect on the spring rate of the hinge/spring assembly 88 of the load beams 86. In the illustrated embodiment, the dampers 94 are disposed between the hinge/spring assembly 88 of the load beam 86 and where the load beam 86 initially starts to interface with its corresponding load beam mount 66. However, it may be desirable in some cases to dispose the damper 94 in the region of the load beam 86 where the spring function is provided to bias the head 90 of the load beam 86 towards their corresponding disk 42 (not shown) to "dampen" the spring radius. Dampening the spring radius may be desirable because: 1) there is less effect to gram load; 2) spring motion can cause undesirable head motion; and 3) there is less suspension mass loading effect.

Multi-functional characteristics may be incorporated into each of the dampers 94. Positional biasing of the heads 90 toward their corresponding disk 42 is principally provided by the hinge/spring assembly 88 which is incorporated into the structure of the load beam 86 in the form of a predetermined bend(s) and/or cutout(s). This biasing may be augmented to at least a certain degree by the dampers 94. Exposure of the damper 94 to a compressive force when disposed between a pair of load beams 86 will bias these load beams 86 away from each other and thereby toward their corresponding disk 42. This same compressive force exerted on the dampers 94 may be used to retain the same between the noted pairs of load beams 86. That is, by having the dampers 94 remain in a compressive state when disposed between a given pair of load beams 86, an increased frictional interface will develop between the damper 94 and its corresponding load beams 86. It is possible that exposure of the damper 94 to compressive forces when disposed between a pair of load beams 86 would be sufficient for retention of the damper 94 in this position through an increased frictional interface with the load beams 86, thereby alleviating the need to attach the damper 94 to its corresponding load beam mount 66. However, the damper 94 need not be in a compressed state when bonded to appropriate structure of the disk drive 38. That is, "preloading" of the dampers 94 is not required.

Another function which may be provided by the dampers 94 is one of filtering. For instance, forming the dampers 94 from a foam or the like may provide suitable damping characteristics. The porous structure of a foam may also act as a filter for particulate matter which may exist/develop within the confines of the encasement for the disk drive 38. A more suitable filtering material could also be separately attached to the damper 94 to define a laminated structure (one layer principally for damping, and another layer principally for filtering (not shown)).

Yet another function provided by the dampers 94 when disposed between adjacent load beams 86 in the noted manner is modification of the air flow characteristics within the disk drive 38. Air flows within the disk drive 38 should be reduced by the inclusion of the dampers 94 in the design of the disk drive 38, which in turn should reduce vibrations of the load beams 86 to at least a degree within the disk drive 38. It is also possible that the dampers 94 could be contoured/shaped so as to facilitate a certain type of air flow within the encasement of the disk drive 38. For instance, the dampers 94 could be shaped/contoured to actually direct the air flow to a certain region within the disk drive 38, for instance to one or more filters. The dampers 94 may also provide a shrouding function or more specifically may divert intradisk air flow away from the suspensions or load beams 86 and arm tips or load beam mounts 66.

Appropriate materials for the dampers 94 include viscoelastic materials, elastomers, foams, springs, marmem (memory metal), and the like. There are ways of characterizing "damping" function of the dampers 94 other than by material selection. For instance, the damper 94 may be characterized as a structure which dampens even its own vibrations. Yet another way of characterizing the dampers 94 is as a structure which converts vibrational energy into heat or which principally employs hysterisis damping. "Hysterisis damping" is also referred to as solid or structural damping, or where the internal friction of the material itself is used to provide the damping function (e.g., where deformation of the material is an accumulation of the internal displacements of the material, where such displacements are accompanied by frictional resistance, and where the energy so absorbed is dissipated in the form of heat). Although all materials exhibit some form of hysterisis damping, preferably the dampers 94 are formed from materials such that this damping occurs more efficiently. Still another way of characterizing the damping capabilities of the dampers 94 is that it has a transmissibility (i.e., a ratio of the amount of force transmitted by a given damper 94 to a force applied to such damper 94) of no more than about 80%. Finally, the dampers 94 may be characterized as any structure which dampens an amplitude of an oscillatory motion of any one or more of load beams 86 of the noted load beam pair by least about 20% in comparison to if the damper 94 was removed, but with same oscillatory motion continuing.

Figure 4:
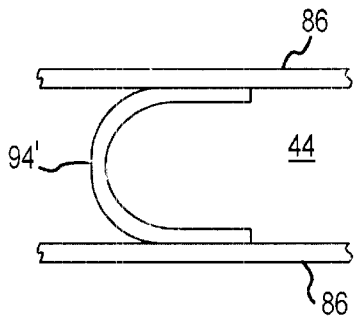
FIG. 4 is a partial cutaway side view of the disk drive of FIG. 2 with an alternative damper structure to that presented in FIG. 3.

FIG. 3 illustrates that the dampers 94 may be in the form of a "block" of materials or the like. Other configurations may be appropriate. For instance, each damper 94 in FIG. 3 could assume the generally C-shaped profile of the damper 94' illustrated in FIG. 4. The damper 94' could be a laminated structure which would be beneficial in that it could have different damping properties in each layer (not shown), or could be a unitary structure as shown which would be beneficial in that it would then be simple to manufacture and assemble, and thereby potentially lower in cost. It may even be possible to dispose a simple coil spring or the like between a pair of load beams 86 which extend into a common space 44 to function as a damper as well.

Damping may also be provided for the suspensions or load beams 86 which are associated with the two extreme read/write surfaces 48 of the stack 40 of the disk drive 38, namely for the upper read/write surface 48 of the uppermost disk 42 in the stack 40 and the lower read/write surface 48 of the lowest disk 42 in the stack 40 (i.e., those read/write surfaces 48 which are not disposed in opposing relation to another read/write surface 48). FIG. 5 illustrates the lowest disk 42 in the stack 40 of FIG. 3. The suspension or load beam 86 is appropriately attached to the actuator arm tip or load beam mount 66' which has a different configuration than those illustrated in FIG. 3, and thereby includes the "single prime" designation. The load beam mount 66' presented in FIG. 5 includes a notch 63 which is provided by having a first surface 64 of the load beam mount 66 disposed in vertically spaced relation to a second surface 65 of the load beam mount 66'. Part of the load beam 86 is disposed in overlying and interfacing relation with the first surface 64, and is appropriately secured thereto (e.g., via staking). The load beam 86 extends beyond the load beam mount 66 toward its corresponding disk 42. The damper 94 is disposed in the space between the second surface 65 of the load beam mount 66 and that portion of the load beam 86 which are disposed in parallel, overlying relation. The load beam 86 continues along an at least substantially linear or axial path from where it interfaces with the damper 94 to its hinge/spring assembly 88 (i.e., the damper 94 and hinge/spring assembly 88 are separate structures). The hinge/spring assembly 88 is a predetermined bend which is formed in the load beam 86 to direct the load beam 86, and thereby the head 90 attached to the end thereof, toward its corresponding disk 42 in a predetermined manner, and which may also include one or more cutouts. Therefore, the damper 94 is a different structure from both the hinge and the spring associated with the load beam 86, and provides principally a damping function versus the biasing/loading functions provided by the hinge/spring assembly 88 of the load beam 86. The configuration presented in FIG. 5 need not be limited for use in a disk drive having a disk stack, but may also be used in a disk drive having only a single disk.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive, comprising:

a computer-readable storage medium system comprising first and second disks which are separated by a first space and which each comprise a computer-readable storage medium;

an actuator arm block;

first and second load beams attached to said actuator arm block at first and second locations, respectively, associated with said first and second disks, respectively, and at least disposable in said first space;

first and second heads at third and fourth locations, respectively, on said first and second load beams, respectively, and at least alignable with said first and second disks, respectively;

a drive assembly interconnected with said actuator arm block; and a damper disposed between and in contact with each of said first and second load beams, wherein said damper comprises a viscoelastic material, wherein said damper engages said first load beam between said first and third locations, and wherein said damper engages said second load beam between said second and fourth locations.

2. A disk drive, as claimed in claim 1, wherein:

said computer-readable storage medium system further comprises a vertically disposed spindle, each of said first and second disks are rotatably mounted on said spindle, and said first and second disks are vertically spaced on said spindle.

3. A disk drive, as claimed in claim 1, wherein:

each of said first and second load beams comprises a hinge and a spring, wherein said hinge and said spring of said first load beam biases said first head toward said first disk, said hinge and said spring of said second load beam biases said second head toward said second disk, and said damper is different from said spring of said first load beam and said spring of said second load beam.

4. A disk drive, as claimed in claim 1, wherein:

said first and second heads each comprises a read/write head.

5. A disk drive, as claimed in claim 1, wherein:

said drive assembly comprises a rotary actuator.

6. A disk drive, as claimed in claim 1, wherein:

said damper is disposed at least proximate an interconnection between said first and second load beams and said actuator arm block.

7. A disk drive, as claimed in claim 1, wherein:

an interconnection between said first and second load beams and said actuator block is disposed beyond a perimeter of each of said first and second disks.

8. A disk drive, as claimed in claim 1, wherein:

a gram-load of each of said first and second load beams with said damper disposed therebetween is no more than about 0.5 gram force.

9. A disk drive, as claimed in claim 1, wherein:

said damper is under compression when disposed between said first and second load beams.

10. A disk drive, as claimed in claim 1, wherein:

said actuator arm block comprises a first actuator arm tip, wherein said first actuator arm tip comprises upper and lower surfaces and an end surface, wherein said first load beam interfaces with said upper surface of said first actuator arm tip, wherein said second load beam interfaces with said lower surface of said first actuator arm tip, and wherein said damper interfaces with said end surface of said first actuator arm tip.

11. A disk drive, as claimed in claim 1, wherein:

said damper dampens its own vibrations.

12. A disk drive, as claimed in claim 1, wherein:

said damper is fixedly interconnected with said first and second load beams.

13. A disk drive, as claimed in claim 1, wherein:

said damper is only frictionally interconnected with each of said first and second load beams.

14. A disk drive, as claimed in claim 1, wherein:

said damper comprises means for converting vibrational energy into heat.

15. A disk drive, as claimed in claim 1, wherein:

said damper comprises a filter.

16. A disk drive, as claimed in claim 1, wherein:

said first and second load beams comprise first and second hinge/spring assemblies, respectively, wherein said damper is separate and displaced from each of said first and second hinge/spring assemblies.

17. A disk drive, as claimed in claim 1, wherein:

a transmissibility of said damper is no more than about 80%, wherein said transmissibility is a ratio of a force transmitted to said second load beam through said damper by a force exerted on said first load beam.

18. A disk drive, as claimed in claim 1, wherein:

said damper dampens an amplitude of an oscillatory motion of any one or more of said first and second load beams by at least about 20% in comparison to if said damper was removed from between said first and second load beams.

\* \* \* \* \*